(12) United States Patent
Haussmann et al.

(10) Patent No.: US 6,976,549 B2
(45) Date of Patent: Dec. 20, 2005

(54) DRILLING TOOL

(75) Inventors: August Haussmann, Ravensburg (DE);
Bernhard Moser, Altshausen (DE);
Rainer Widmann, Langenargen (DE);
Marco Lang, Ravensburg (DE)

(73) Assignee: Hawera Probst GmbH, Ravensburg (DE)

( * ) Notice: Subject to any disclaimer, the term of this patent is extended or adjusted under 35 U.S.C. 154(b) by 82 days.

(21) Appl. No.: 10/375,106

(22) Filed: Feb. 28, 2003

(65) Prior Publication Data
US 2003/0159855 A1 Aug. 28, 2003

(30) Foreign Application Priority Data
Feb. 28, 2002 (DE) .................................. 102 08 631

(51) Int. Cl.⁷ .......................... E21B 10/36; E21C 35/18
(52) U.S. Cl. .................. 175/420.1; 175/420; 175/415; 175/401; 299/112 R
(58) Field of Search .............................. 175/415, 420, 175/420.1, 419, 401; 408/224, 225, 227, 408/228, 230, 713; 299/112 R

(56) References Cited
U.S. PATENT DOCUMENTS

| | | | |
|---|---|---|---|
| 3,671,075 A | * | 6/1972 | Eyre et al. .............. 299/112 R |
| 4,143,920 A | * | 3/1979 | Haddock ................ 299/112 R |
| 4,903,609 A | * | 2/1990 | Isakov et al. ................ 104/10 |
| 5,184,689 A | * | 2/1993 | Sheirer et al. ........... 175/420.1 |
| 6,176,332 B1 | * | 1/2001 | Massa et al. ............ 175/420.1 |
| 6,260,637 B1 | * | 7/2001 | Haussmann et al. ..... 175/420.1 |
| 6,446,741 B1 | * | 9/2002 | Kersten et al. ............. 175/428 |
| 6,450,272 B2 | * | 9/2002 | Hauptmann et al. ........ 175/394 |
| 6,742,610 B2 | * | 6/2004 | Peetz ...................... 175/420.1 |

FOREIGN PATENT DOCUMENTS

| | | | | |
|---|---|---|---|---|
| DE | 19734094 A1 | 5/1998 | | |
| DE | 19944406 A1 | 5/2001 | | |
| DE | 010011108 A1 | * | 9/2001 | ............ B28D 1/14 |
| EP | 0452255 B1 | 10/1991 | | |
| WO | WO 96/36451 A1 | 11/1996 | | |

* cited by examiner

*Primary Examiner*—David Bagnell
*Assistant Examiner*—Shane Bomar
(74) *Attorney, Agent, or Firm*—Venable LLP; Robert Kinberg; Steven J. Schwarz

(57) ABSTRACT

The invention relates to a drilling tool (1), in particular for working concrete, rock, masonry and suchlike materials, having a tool head with cutting body (5) which has at least one front rake face (9, 10), at least one rear flank ([lacuna] 18) and at least one front-end cutting edge (7, 8), the cutting edge (7, 8) separating the rake face (9, 10) and the flank ([lacuna] 18). In this case, the rake face (9, 10) is formed by at least two cutting faces (11, 13; 12 [lacuna]) merging into one another at at least one second cutting edge (15, 16).

10 Claims, 4 Drawing Sheets

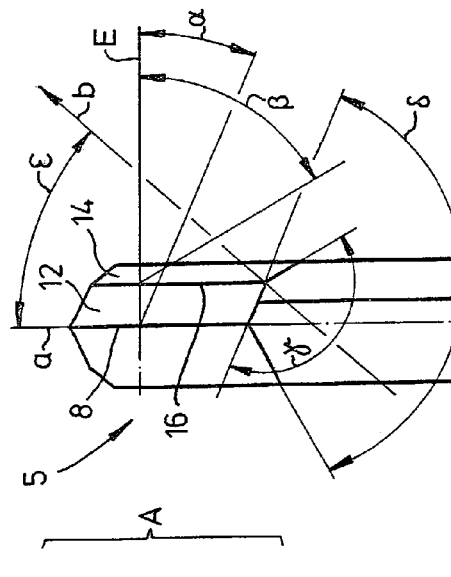

DRILLING TOOL

The invention relates to a drilling tool according to the preamble of claim 1.

Conventional drilling tools and in particular rock drills consist of a drill shank with a clamping end and of a drill head opposite the clamping end. In side view, the drill head is essentially formed by a cutting element which is preferably designed as a carbide tip and has a gable-shaped appearance in side view.

EP 0 452 255 B1 has disclosed such a drilling tool. The cutting element embedded in the drill shank has cutting edges which are arranged in the effective direction in mirror symmetry to the tool longitudinal axis and are connected by a chisel edge. A rake face and a flank are in each case assigned to the cutting edges. In such a design, the cutting edges and the chisel edge are subjected to a high stress or they wear rapidly, since the percussion loading which occurs during rock drilling, i.e. during percussion drilling, mainly acts first of all on the cutting edges or the chisel edge. On the other hand, during rock drilling or concrete drilling, situations also occur in which the chisel edge strikes at least partly in a "void", since the amorphous material to be worked is already removed by the preceding blow.

The object of the invention is to propose a drilling tool and in particular a cutting tip for a drilling tool, in which optimization of the shape of the cutting tip region acting on the rock leads to an improved removal capacity and prolonged tool life or increased protection of the cutting edges.

Based on a drilling tool according to the preamble of claim 1, this object is achieved by the characterizing features of claim 1. Advantageous and expedient developments of the tool described in claim 1 are specified in the subclaims.

The invention is based on the knowledge that the rock drills which are both rotated and struck by the machine driving them are optimized too one-sidedly in individual effective regions for one of the two types of loading—rotary loading or percussion loading. According to the invention, by the subdivision of the rake face into at least two cutting faces merging into one another at a second cutting edge, an effective region is optimized with regard to the rotary loading and the percussion loading. The second cutting edge formed in such a cutting tip is optimized with regard to the peeling or impressing and the chiseling and therefore constitutes a symbiosis of the two basic requirements imposed on a hammer drill. The superiority of a drilling tool of such a design is due to the fact that the percussion direction running in the direction of the longitudinal center axis of the drilling tool and the direction of rotation oriented about the longitudinal axis of the drilling tool have a resultant which is oriented on a helical path approximately in the direction of an angle bisector of a point angle of the second cutting edge. That is to say that the second cutting edge, during operation, acts like a chisel which rotates on a circular path and which peels material during the rotation and, during the percussion in the effective direction of the resultant of direction of rotation and percussion direction, strikes into the material to be worked. Of course, the cutting faces adjoining the second cutting edge likewise contribute to the material removal. The drill according to the invention is highly effective, since it develops a chiseling effect in the percussion direction running in the longitudinal direction of the drilling tool and also a chiseling effect which transposes the rotary/percussion component resulting from the direction of rotation and the percussion direction. Since the cutting tip is not a solid of revolution, the cutting tip, during its movement on the helical path, constantly strikes material to be disintegrated which is situated at the side.

An advantageous design of the subject matter of the invention provides for a smaller cutting-face angle to be provided for the cutting face which is arranged between the first cutting edge and the second cutting edge than for the second cutting face, which together with the first cutting face forms the second cutting edge. In this way, a sturdy configuration of the cutting tip in the region of the first cutting edge is possible, and at the same time the large rake-face angle of the second cutting face permits a slim design overall of the cutting tip, this slim design assisting the penetration.

Furthermore, the invention provides for the first cutting edges to merge directly into one another at the intersection of the cutting tip with the longitudinal center axis of the drilling tool or at the point of the cutting tip. In this way, the formation of a chisel edge is avoided and the first cutting faces run up to the point of the cutting tip, so that a cutting face optimally oriented to the cutting edge is available here too.

An embodiment variant of the subject matter of the invention provides for the drilling tool to be equipped with a cutting tip which has a central, first effective section, gable-shaped in side view, in the region of the point of the cutting tip and a second effective section set back from the first effective section in the effective direction. In this way, it is possible for the loads of the cutting tip which vary in the radial direction to be taken into account to an even greater extent in the configuration of the cutting-tip geometry and for the orientation of edges and surfaces to be optimally designed for these conditions.

The invention advantageously provides for the angle bisector of the point angle of the second cutting edge to be oriented approximately in the direction of a resultant of the percussion component and rotary component acting on the drilling tool. This produces an optimum, additional chiseling effect of the additional chisel resulting from the second cutting edge and the cutting faces forming the latter.

Further details and advantages of the invention follow from the description below of exemplary embodiments of the invention, which are explained in more detail with reference to the drawings.

In the drawings:

FIG. 2a shows a plan view of a first cutting tip,

Figure 3C:
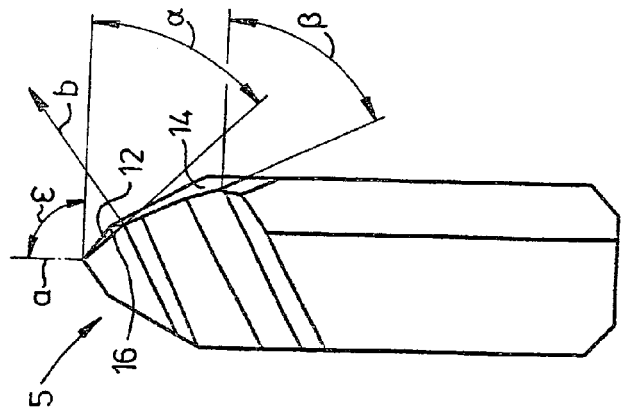
Figure 3D:
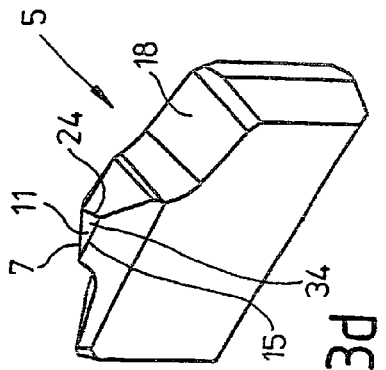
Figure 3B:
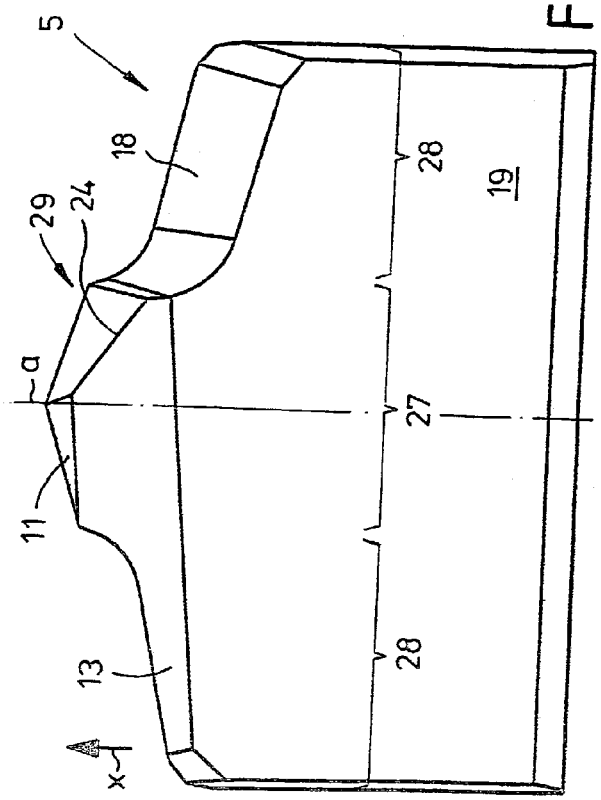
Figure 3A:
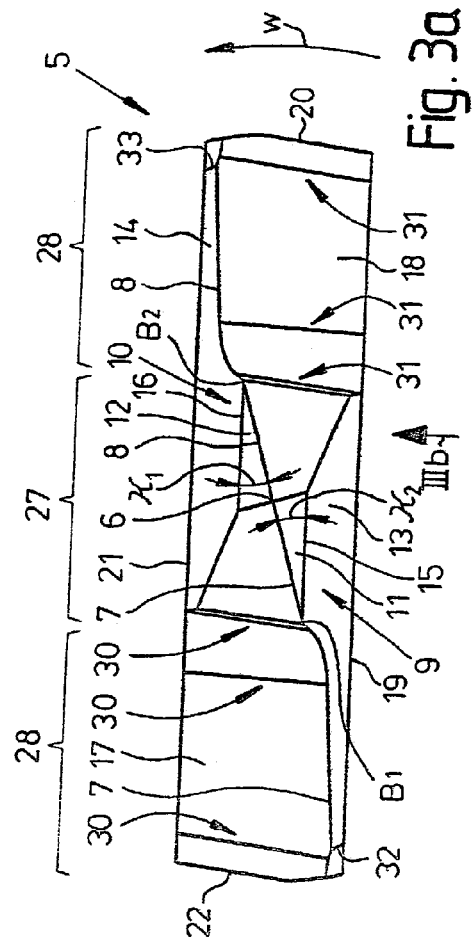
Figure 4C:
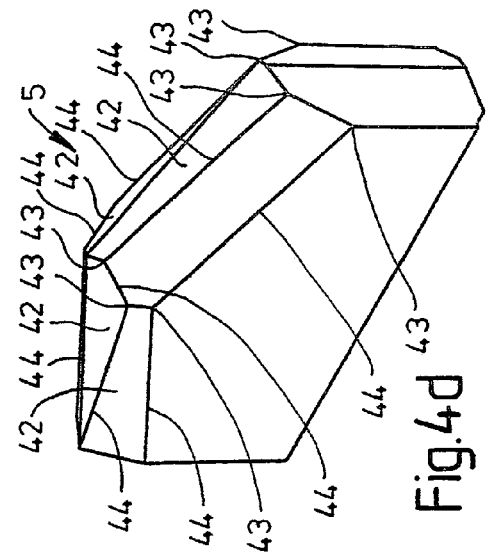
Figure 4D:
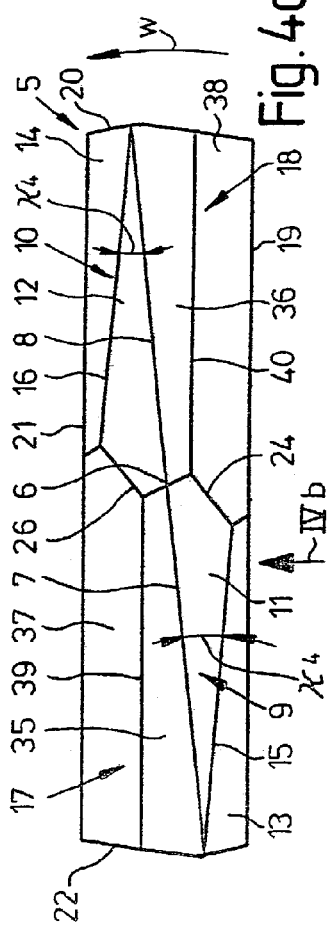
Figure 4B:
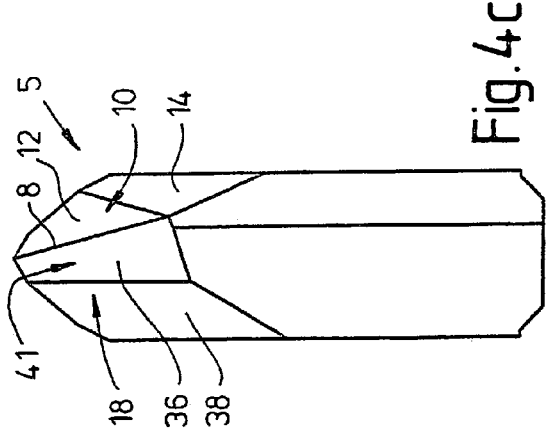
Figure 4A:
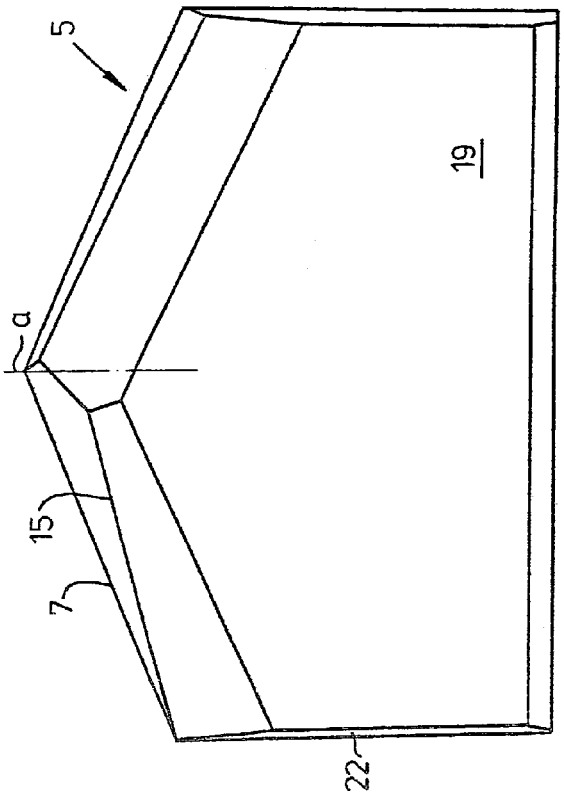

FIG. 2b shows a side view of the cutting tip shown in FIG. 2a from an arrow direction IIb, FIG. 2c shows a side view from the right of the cutting tip shown in FIGS. 2a and 2b, FIG. 2d shows a perspective view of the cutting tip shown in FIGS. 2a to 2c, FIG. 3a shows a plan view of a second cutting tip, FIG. 3b shows a side view of the cutting tip shown in FIG. 3a from the arrow direction IIIb, FIG. 3c shows a side view from the right of the cutting tip shown in FIGS. 3a and 3b, FIG. 3d shows a perspective view of the cutting tip shown in FIGS. 3a to 3c, FIG. 4a shows a plan view of a third cutting tip, FIG. 4b shows a side view of the cutting tip shown in FIG. 4a from the arrow direction IVb, FIG. 4c shows a side view from the right of the cutting tip shown in FIGS. 4a and 4b, and FIG. 4d shows a perspective view of the cutting tip shown in FIGS. 4a to 4c.

The cutting tips shown in FIGS. 2a to 4d are also to be understood as cutaway detail representations of one-piece tools.

Figure 1:
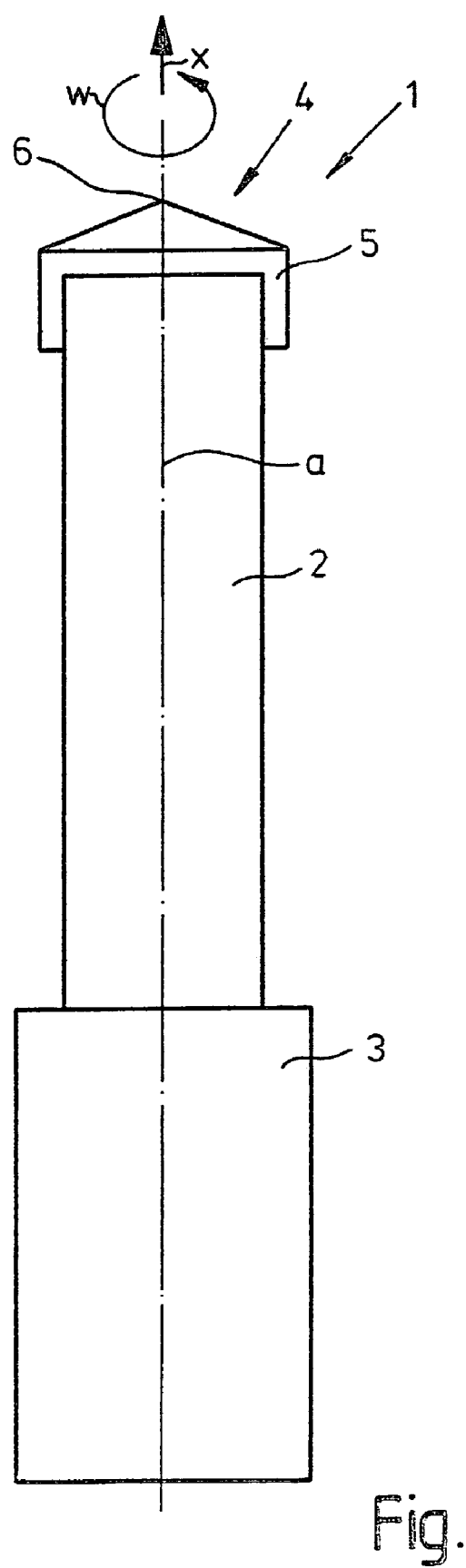
FIG. 1 shows a schematic side view of a drilling tool.

A schematic side view of a drilling tool 1 is shown in FIG. 1. The drilling tool 1 essentially comprises a drill shank 2 a clamping end 3, which is designed, for example, as an "SDS-plus shank", and a drill head 4. The drill head 4 is formed by a cutting tip 5 inserted into the drill shank 2. The drilling tool 1 has a longitudinal center axis a, which intersects the drill head 4 at a point 6.

A plan view of a cutting tip 5 is shown in FIG. 2a. The cutting tip 5 has two cutting edges 7, 8 which merge into one another rectilinearly at a point 6. In a direction of rotation w, rake faces 9, 10, which are each composed of two cutting faces 11, 13 and 12, 14, respectively, are assigned to the cutting edges 7, 8.

The cutting faces 11, 13 and 12, 14, respectively, together form in each case a second cutting edge 15 or 16, respectively, which runs parallel to the first cutting edge 7 or 8, respectively. Assigned in each case to the rake faces 9, 10 is a flank 17, 18, which trails the cutting edges 7, 8 in the direction of rotation w. Toward the sides, the cutting tip 5 is formed by side faces 19 to 22, the side faces 19, 21 being opposite one another approximately in parallel.

A side view of the cutting tip 5 shown in FIG. 2a is depicted in FIG. 2b from the arrow direction IIb. In the side view, the side faces 19, 21, defined in a top region A of the cutting tip 5 by the cutting faces 13, 14 and the flanks 17, 18, respectively, form a gable 23. The cutting faces 11, 13 merge into the flank 18 at a transition edge 24 which has a right-angled course. The transition edge 24 runs from a point 25 of the gable 23 to the point 6 of the cutting tip 5. Likewise, the cutting faces 12, 14 merge into the flank along a transition edge 26, the transition edge 26 also having a right-angled course (see FIG. 2a).

A side view from the right of the cutting tip 5 shown in FIGS. 2a and 2b is depicted in FIG. 2c. The cutting faces 12, 14 form a rake-face angle α or β, respectively, relative to a plane E lying perpendicularly to a tool longitudinal axis a. In this case, the rake-face angle α of the cutting face 12 is smaller than the rake-face angle α of the cutting face 12 is smaller than the rake-face angle β of the rake face 14. For example, the rake-face angle α is about 30° and the rake-face angle β if about 60°. Furthermore, the first cutting edge 8 has a point angle γ and the second cutting edge 16 has a point angle δ. The point angle γ of the first cutting edge is about 90°. The point angle δ of the second cutting edge 16 is about 140°. An angle bisector b of the point angle γ of the second cutting edge 16 runs with an angle of ε=45° relates to the longitudinal center axis a. This means that the second cutting edge 16, or also the second edge 15 which cannot be seen in FIG. 2 and runs in a centrosymmetrical manner relative to the cutting edge 16, is oriented so as to act in an angular percussive manner on the rock to be worked.

A perspective view of the cutting tip 5 shown in FIGS. 2a to 2c is depicted in FIG. 2d. The cutting tip 5 has the special shape of a mansard roof in the region of the rake faces 9, 10, the upper surface inclined at a small angle being formed by the cutting face 11 or 12, respectively, and the lower surface inclined at a steep angle being formed by the cutting face 13 or 14, respectively. As a result, the cutting tip 5 is also able to use the rotary energy introduced into the drilling tool in an optimum manner for the percussive removal or disintegration of the rock, since the second cutting edges 15, 16 are designed for disintegrating the rock oriented relative to the side faces 19, 21.

A plan view of a further cutting tip 5 is shown in FIG. 3a. The cutting tip 5 has two cutting edges 7, 8 which merge rectilinearly into one another at a point 6. The cutting edges 7, 8, starting from the point 6, run first of all in a central region 27 of the cutting tip 5 and then merge from this central region 27 in a curved manner into outer regions 28 of the cutting tip 5. The outer regions 28 are set back from the central region 28 in the direction of a longitudinal center axis a of the cutting tip 5, so that the cutting tip 5 has a nose 29 in the central region (also see FIG. 3b). In a direction of rotation w, rake faces 9, 10, which are each composed of two cutting faces 11, 13 and 12, 14, respectively, are assigned to the cutting edges 7, 8. The cutting faces 11, 13 and 12, 14, respectively, together form in each case a second cutting edge 15 or 16, respectively. The second cutting edges 15, 16 run in the central region 27 of the cutting tip 5 at an angle κ1 or κ2, respectively, relative to the cutting edges 7, 8 and merge with the latter at intersections $B_1$, $B_2$. Assigned to the cutting edges 7, 8 against the direction of rotation w are flanks 17, 18 which run from the central region 27 into the outer regions 28 via a plurality of steps 30 and 31, respectively. In the outer regions 28, the cutting faces 13, 14 have a bend 32, 33. The cutting tip 5 is laterally defined by side faces 19 to 22, the side faces 19, 21 running approximately parallel to one another.

A side view of the cutting tip 5 shown in FIG. 3a is depicted in FIG. 3b from the arrow direction IIIb. In an effective direction x of the cutting tip 5, its nose 29 lying in the central region 27 projects relative to the outer regions 28. The cutting faces 11, 13 merge into the flank 18 at a transition edge 24 which has the shape of a polyline.

FIG. 3c, in a side view from the right, shows the cutting tip 5 shown in FIGS. 3a and 3b. The cutting face 12 has a rake-face angle α and the cutting face 14 has a rake-face angle β. The rake-face angle α is about 45° and the rake-face angle β is about 65°. An angle bisector b which bisects a point angle (not shown) of the second cutting edge 16 runs approximately at an angle ε to the longitudinal center axis a of the cutting body 5. In this case, the angle ε is about 45°.

A perspective view of the cutting tip 5 shown in FIGS. 3a to 3c is depicted in FIG. 3d. The step-shaped profile of the flank 18 can be seen in this view. It can also be seen that the cutting face 11, defined by the first cutting edge 7, the second cutting edge 15 and the transition edge 24, forms a triangle 34. In the embodiment variant shown in FIGS. 3a to 3d, the second cutting edge 15 or 16, respectively, runs only in the central region 27, in which the cutting tip 5 is also exposed to the maximum percussion loads. In this region, the second cutting edge 15 or 16, respectively, supports the cutting edges 7, 8 by constituting a further edge which transmits percussion energy or rotary/percussion energy to the rock to be disintegrated.

FIG. 4a shows a plan view of a further cutting tip 5. This cutting tip 5 has cutting edges 7, 8 which merge rectilinearly into one another at a point 6 of the cutting tip 5. In a direction of rotation w, rake faces 9, 10 are assigned to the cutting edges 7, 8. The rake faces 9, 10 in turn are composed of cutting faces 11, 13 and 12, 14, respectively, which together form second cutting edges 15 and 16, respectively. In plan view, these second cutting edges run at angles κ3, κ4 relative to the first cutting edges 7, 8. The cutting edges 7, 8 merge into flanks 17, 18 against the direction of rotation. The latter are in turn formed from individual flanks 35, 37 and 36, 38, respectively. Respective edges 39 and 40 are formed at the transition of the flank 35 into the flank 37 and at the transition of the flank 36 into the flank 38, since the flanks 35 to 38 lie in differently inclined planes. Transition edges 24 and 26 between the surfaces 11, 13, 36, 38 and 12, 14, 35, 37, respectively, are designed as zigzag lines. Side faces 19 to 22 define the cutting tip 5 toward the sides. In this case, the side faces 19, 21 are approximately parallel to one another.

A side view of the cutting tip 5 shown in FIG. 4a is shown in FIG. 4b from an arrow direction IVb. The second cutting edge 15 or percussion edge 15 runs up to the side face 22 and therefore supports the cutting edge 7 over approximately the entire length.

FIG. 4c shows a side view from the right of the cutting tip 5 shown in FIGS. 4a and 4b. By the subdivision of the flank 18 into two flanks 36, 38 and the simultaneous subdivision of the rake face 10 into two cutting faces 12, 14, the cutting tip 5 is given a sturdy, rapidly widening chisel shape 41 in the region of the cutting edge 8.

A perspective view of the cutting tip shown in FIGS. 4a to 4c is shown in FIG. 4d. Due to the fact that a total of 8 flanks 42 meet one another, which are formed by the cutting face 11 to 14 and the flanks 35 to 38, respectively, that region of the cutting tip 5 which acts mainly on the rock to be disintegrated is given a multiplicity of points 43 and edges 44, which all help to forcibly disintegrate the rock to be worked.

The invention is not restricted to the exemplary embodiments shown or described. On the contrary, it comprises developments of the invention within the scope of the patent claims; in particular, provision is also made for at least one rake face and/or at least one flank to be subdivided into more than two sectional surfaces which lie in differently inclined planes relative to one another.

LIST OF DESIGNATIONS

1 Drilling tool
2 Drill shank
3 Clamping end
4 Drill head
5 Cutting body, cutting tip
6 Point of (4 or 5)
7 Cutting edge
8 Cutting edge
9 Rake face
10 Rake face
11 Cutting face of 9
12 Cutting face of 10
13 Cutting face of 9
14 Cutting face of 10
15 Second cutting edge
16 Second cutting edge
17 Flank
18 Flank
19–22 Side face
23 Gable
24 Transition edge
25 Point of 23
26 Transition edge
27 Central region
28 Outer region
29 Nose
30 Step
31 Step
32 Bend
33 Bend
34 Triangle
35–38 Flank
39 Edge
40 Edge
41 Chisel shape
42 Flank
43 Point
44 Edge

What is claimed is:

1. A drilling tool having a tool head with a cutting body, wherein the drilling tool has a longitudinal center axis which intersects the cutting body and the cutting body is inserted into a drill shank and the cutting body comprises:
   at least one front rake face including at least first and second cutting faces;
   at least one rear flank; and
   at least one front-end cutting edge that separates the rake face and the at least one rear flank,
   wherein the at least first and second cutting faces merge into each other at an at least one second cutting edge;
   further wherein the first cutting face merges into the at least one rear flank at a first cutting edge of the at least one front end cutting edge and has a cutting-face angle ($\alpha$) which is smaller than a cutting-face angle ($\beta$) of the second cutting face, which adjoins the first cutting face.

2. The drilling tool according to claim 1, wherein the cutting body of the drilling tool has a point which is formed while avoiding the formation of a chisel edge.

3. The drilling tool according to claim 1, wherein the cutting body further comprises:
   a roof-shaped central region defined laterally by two outer regions set back in an effective direction (x) of the drilling tool, including the at least one rake face and the at least one rear flank.

4. The drilling tool according to claim 1, wherein the second cutting edge has point angle ($\delta$) with an angle bisector (b) which is at an angle ($\epsilon$) of about 20° to 70° relative to a longitudinal center axis (a) of the drilling tool.

5. The drilling tool according to claim 1, wherein the drilling tool has a gable-shaped appearance in side view.

6. A drilling tool having a tool head with a cutting body, wherein the drilling tool has a longitudinal center axis which intersects the cutting body and the cutting body is inserted into a drill shank and the cutting body comprises:
   at least one front rake face including at least first and second cutting faces;
   at least one rear flank; and
   at least one front-end cutting edge that separates the rake face and the at least one rear flank,
   wherein the at least first and second cutting faces merge into each other at an at least one second cutting edge;
   further wherein the second cutting edge has point angle ($\delta$) with an angle bisector (b) which is at an angle ($\epsilon$) of about 20° to 70° relative to a longitudinal center axis (a) of the drilling tool.

7. The drilling tool according to claim 6, wherein the first cutting face merges into the at least one rear flank at a first cutting edge of the at least one front end cutting edge and has a cutting-face angle ($\alpha$) which is smaller than a cutting-face angle ($\beta$) of the second cutting face, which adjoins the first cutting face.

8. The drilling tool according to claim 6, wherein the cutting body of the drilling tool has a point which is formed while avoiding the formation of a chisel edge.

9. The drilling tool according to claim 6, wherein the cutting body further comprises:
   a roof-shaped central region defined laterally by two outer regions set back in an effective direction (x) of the drilling tool, including the at least one rake face and the at least one rear flank.

10. The drilling tool according to claim 6, wherein the drilling tool has a gable-shaped appearance in side view.

* * * * *